US011065526B2

(12) United States Patent
Russo (10) Patent No.: US 11,065,526 B2
(45) Date of Patent: *Jul. 20, 2021

(54) BRAKING SYSTEMS FOR EXERCISE MACHINES

(71) Applicant: True Fitness Technology, Inc., O'Fallon, MO (US)

(72) Inventor: Tom Russo, St. Charles, MO (US)

(73) Assignee: True Fitness Technology, Inc., O'Fallon, MO (US)

( * ) Notice: Subject to any disclaimer, the term of this patent is extended or adjusted under 35 U.S.C. 154(b) by 32 days.

This patent is subject to a terminal disclaimer.

(21) Appl. No.: 16/429,862

(22) Filed: Jun. 3, 2019

(65) Prior Publication Data

US 2019/0351305 A1    Nov. 21, 2019

Related U.S. Application Data

(63) Continuation of application No. 15/694,253, filed on Sep. 1, 2017, now Pat. No. 10,369,449.

(Continued)

(51) Int. Cl.
*A63B 71/00* (2006.01)
*A63B 22/02* (2006.01)
(Continued)

(52) U.S. Cl.
CPC .... *A63B 71/0054* (2013.01); *A63B 21/00192* (2013.01); *A63B 22/0023* (2013.01);
(Continued)

(58) Field of Classification Search
CPC .............. A63B 71/0054; A63B 22/025; A63B 22/0023; A63B 24/0087; A63B 21/00192;
(Continued)

(56) References Cited

U.S. PATENT DOCUMENTS 4,713,567 A    12/1987  Fey et al.
5,104,119 A     4/1992  Lynch
(Continued)

FOREIGN PATENT DOCUMENTS

CN    2319090 Y    5/1999
CN    202146547 U   2/2012
(Continued)

OTHER PUBLICATIONS

Horizon Fitness, AFG Service Seminar, Models 1.0AT, 2.0AT, 3.0AT, 4.0AT, 5.0AT, 13.0AT, 14.0AT, 2.0AE, 3.0AE, 4.0AE, 14.0AE, 18.0AE, 2.0AR, 3.0AR, 4.0AR, 3.0AH, 4.0AH and 2.0AS, [rev 1.3], 2008 (74 pages).

(Continued)

*Primary Examiner* — Sundhara M Ganesan
(74) *Attorney, Agent, or Firm* — Lewis Rice LLC (57) ABSTRACT

A method for using an active braking mechanism to halt the motion of a treadmill belt, or other exercise machine system, when the engine ceases driving it and to hold the belt, or system, after the brake is engaged. The types of braking systems will generally utilize at least one but often two or more forms of electrical braking. Frictional braking systems may also be present, but the electrical braking systems will generally be primarily responsible for braking the belt at high inclines.

20 Claims, 5 Drawing Sheets

Related U.S. Application Data (60) Provisional application No. 62/382,941, filed on Sep. 2, 2016.

(51) Int. Cl.
*A63B 22/00* (2006.01)
*A63B 24/00* (2006.01)
*H02P 3/24* (2006.01)
*A63B 21/00* (2006.01)

(52) U.S. Cl.
CPC ........ *A63B 22/025* (2015.10); *A63B 24/0087* (2013.01); *H02P 3/24* (2013.01); *A63B 2071/0072* (2013.01); *A63B 2071/0081* (2013.01); *H02P 2207/01* (2013.01)

(58) Field of Classification Search
CPC .... A63B 2071/0072; A63B 2071/0081; A63B 22/0235; A63B 2209/08; A63B 71/0622; H02P 3/24; H02P 2207/01
See application file for complete search history.

(56) References Cited

U.S. PATENT DOCUMENTS

| | | |
|---|---|---|
| 5,318,487 A | 6/1994 | Golen et al. |
| 5,361,022 A | 11/1994 | Brown |
| 5,374,227 A | 12/1994 | Webb |
| 5,643,142 A | 7/1997 | Salerno et al. |
| 5,685,804 A | 11/1997 | Whan-Tong et al. |
| 5,747,955 A | 5/1998 | Rotunda et al. |
| 5,856,736 A | 1/1999 | Rotunda et al. |
| 5,944,635 A | 8/1999 | Butler, Jr. |
| 6,042,513 A * | 3/2000 | Koteles .......... A63B 24/00 318/1 |
| 6,095,951 A | 8/2000 | Skowronski et al. |
| 6,908,416 B2 | 6/2005 | Mercado et al. |
| 7,517,303 B2 | 4/2009 | Crawford et al. |
| 7,559,879 B2 | 7/2009 | Anderson et al. |
| 7,621,850 B2 | 11/2009 | Piaget et al. |
| 7,811,209 B2 | 10/2010 | Crawford et al. |
| 7,988,599 B2 | 8/2011 | Ainsworth et al. |
| 8,157,706 B2 | 4/2012 | Ainsworth et al. |
| 8,403,816 B2 | 3/2013 | Park |
| 9,216,317 B2 | 12/2015 | Golen, Jr. et al. |
| 9,233,272 B2 | 1/2016 | Villani et al. |
| 9,623,281 B2 | 4/2017 | Hendrickson et al. |
| 2005/0009668 A1 | 1/2005 | Savettiere et al. |
| 2007/0123396 A1 | 5/2007 | Ellis |
| 2009/0137367 A1 | 5/2009 | Hendrickson et al. |
| 2016/0067537 A1 | 3/2016 | Bayerlein et al. |
| 2016/0354638 A1 | 12/2016 | Carr |
| 2017/0001075 A1 | 1/2017 | Butler, Jr. et al. |
| 2017/0333747 A1 | 11/2017 | Athey |

FOREIGN PATENT DOCUMENTS

| | | |
|---|---|---|
| CN | 203135633 U | 8/2013 |
| EP | 1584356 B1 | 4/2008 |
| WO | 2004041367 A2 | 5/2004 |

OTHER PUBLICATIONS

Precor Inc. Service Manual, C956i, C966i Treadmill (Gen 06), 2006 (55 pages).

* cited by examiner

BRAKING SYSTEMS FOR EXERCISE MACHINES

CROSS REFERENCE TO RELATED APPLICATION(S)

This application is a Continuation of U.S. Utility patent application Ser. No. 15/694,253, filed Sep. 1, 2017, which in turn claims the benefit of U.S. Provisional Patent Application Ser. No. 62/382,941, filed Sep. 2, 2016. The entire disclosure of all the above documents is herein incorporated by reference.

BACKGROUND OF THE INVENTION

1. Field of the Invention

This disclosure relates to the field of braking systems for cardiovascular exercise machines. In particular, to braking systems for cardiovascular machines such high-incline treadmills, stair climbers, ladder climbers, and other exercise machines which provide high incline exercise.

2. Description of the Related Art

The benefits of regular aerobic exercise on individuals of any age are well documented in fitness science. Aerobic exercise can dramatically improve cardiac stamina and function, as well as lead to weight loss, increased metabolism, and other benefits. At the same time, aerobic exercise has often been linked to damaging effects, particularly to joints or similar structures, where the impact from many aerobic exercise activities can cause injury. Therefore, those involved in the exercise industry are continuously seeking ways to provide users with exercises that have all the benefits of aerobic exercise, without the damaging side effects.

Many exercises, however, have built-in limitations for strenuousness. Some studies have indicated that any person's natural walking speed may be preferentially selected to minimize work for desired distance and time. Thus, natural walking as an exercise can be problematic because humans may naturally walk in a very efficient fashion, which can minimize its exercise potential as the purpose for exercise is generally to require the body to do "extra" work.

To impose additional strenuousness on an exercise machine, inclines are commonly used. Inclines force the user to walk, run, or climb consistently "uphill." That is, the user is having to fight gravity as part of the exercise movement. High incline exercise machines can provide inclines as part of an exercise which can be performed at any incline (such as walking or running), while other high-incline exercise machines can provide for specific climbing activities such as stair climbing, ladder climbing, or rock climbing which can only really be performed vertically. Regardless of the type of exercise, inclusion of a vertical component of an exercise will generally rapidly increase its strenuousness over comparable motions and can be particularly valuable on exercise machines where variables such as terrain variation and wind resistance aren't factors. Walking or running at even a relatively slight angle above neutral has been shown to dramatically increase the strenuousness of the walking or running and stair climbing can be an extremely effective exercise for even relatively short time periods.

High incline machines can have usability issues, however. This is particularly true for those that produce an inclined surface using a continuous smooth belt such as high-incline treadmills. The machines can feel unstable at high inclines as the user is moving against a moving system and is doing so with gravity tugging at them. Further, because of the incline, gravity's tug is often not down but partially backward, which can feel awkward. Further, as the incline increases, the user will often have their feet making less contact with the belt as their foot position moves from their sole to more just the toes. A user is, thus, not only worried about falling off the back of the machine due to belt motion, but of falling off the machine and onto the floor due to slipping on the belt or falling backwards. Further, at higher speeds, the movement of the belt can be substantial and the user needs to keep up. This often results in users leaning back or forward in bad posture positions to feel more comfortable with their balance.

A user's fear of falling of the machine is not unjustified. Walking and running are motions that can result in falls and carrying out such motions on an exercise machine, where space is limited and the motion is slightly unnatural, can result in additional falls. In fall situations, most modern exercise machines use some form of pull key safety system to stop the motion of the machine so that a user does not suffer additional injury after the fall from being hit by moving parts or by the machine "throwing" them into other objects from its movement continuing after the user has fallen. Safety key systems can utilize a number of different specific mechanisms to trigger, but generally all operate in accordance with the same principle. Specifically, when the safety key is pulled, the electrical connection from the electrical source and the motor is broken with some form of circuit breaker mechanism. Thus, there is immediately no power provided to the motor and the motor will rapidly stop due to internal friction.

Braking and stopping systems in exercise machines are well established as they traditionally are also used to provide for belt movement smoothness (e.g. to counteract the weight of the user as the machine inclines and therefore keep the belt speed constant as the incline occurs) as well as to provide a fixed amount of resistance. Braking mechanisms, however, in exercise machines have traditionally relied on friction. Generally, the halting of the belt is caused because a user's mass on the belt will serve to push the belt into the tread deck over which the belt runs. Once the motor is stopped, the friction between the belt and the tread deck becomes a much more substantial component in the belt motion. Further, it is well known that a stopped motor has internal friction from the various components (generally electromagnets) which turn the axle when the motor is powered now having to be forced through an unpowered motion. Thus, stopping of the motor generates substantial friction against the belt which, given the mass of the user on the belt, will usually halt the belt.

While this type of braking is plenty sufficient for stopping the belt in most circumstances, and even in emergencies, when the belt is at a relatively low angle, these types of systems do not always work with higher-incline exercises. At a higher angle, gravity is not pulling all or a vast majority of the user's mass into the belt and tread deck. Instead, it is pulling the user's mass at the inverse of the angle of incline which is backwards to the user in most cases. Thus, a good portion of the user's mass is being pulled in the direction of belt rotation. This results in the amount of force to create friction to stop the belt being decreased and also increasing the amount of force a user's mass will attempt to impart to the belt. This two prong reduction in the frictional force generated by the presence of the user's mass on a high incline system is much less than on a low incline and therefore will often serve to actually move the belt, as opposed to slow it.

A second issue in many traditional friction systems is that while a frictional brake can often stop the movement of the belt, the belt will only be held while the brake is engaged. In a friction brake, this may stop and hold the belt for only a relatively short period of time (e.g. for a second or two) as the motor fights being moved. However, once the belt stops, the force to move it again may actually be less and the system may "let up" on the brake as the friction decreases. Systems which rely on friction for emergency braking can, thus, readily go into a free motion state after a few seconds. For a high incline exercise machine, particularly a treadmill, this can make a stop while the device is at a high incline particularly problematic as it presents a second point of danger to the user from motion restarting after it has stopped.

This latter concern is best illustrated by considering the emergency stop where the user is presumed to be in trouble. In prior systems, when the key is pulled the engine immediately stops and the belt is generally held in its position for a second or two as the engine effectively fights the motion of the belt. While this can cause a user to pitch forward, as the emergency stop generally only occurs when a user has moved sufficiently far away from the standard operating position of the machine to indicate a likely problem, it generally isn't an issue and the bigger concern is a user who has fallen falling onto the moving belt. Thus, by having the belt come to a complete stop the user is inhibited from becoming caught up in moving components.

In traditional systems, one the belt has stopped, the brake is commonly released shortly thereafter because the force imparted by the stopped motor to resist movement of the belt is decreased. This can allow the motor to freewheel a little after the belt has stopped. If a user actually has fallen on the treadmill and is lying on the belt or has otherwise left the machine, this doesn't really matter. They will be in a position where a freewheel is unlikely to harm them. However, for a treadmill at a substantial angle or incline, it can be an issue. A user in this scenario that has fallen into the belt generally is not only lying against or on the belt, but a substantial amount of their body mass is being pulled by gravity along the path of motion of the belt. Thus, when the brake releases (or more accurately the resistance in the motor decreases) and the belt can freewheel, the mass of the user can actually serve to move the belt in a completely separate motion and this can be relatively quickly backwards. Thus, braking systems which do not engage and stay engaged until the system has been "safed" can be problematic for emergency braking scenarios.

Freewheeling after braking exists because of the design of most treadmill motors and brakes. By far the most common type of motor used in treadmills is an induction motor. The rotation of the rotor in an induction motor (whether single phase or three phase) generally is dependent on an alternating current being supplied to the stator and the rotating magnetic field being created. As soon as the current is removed, there is no more rotating magnetic field in the stator. There is, thus, no more induced electrical current in the rotor. However, as there is some instantaneous current in the rotor due to it still rotating at the instant of power cut-off, the rotor will attempt to generate electricity in the stator, but this flow is in the reverse to the previously provided flow. In effect, at this instant, the slip goes from positive to negative in a very short period of time. The rotor, thus, stops suddenly as the electricity in the stator creates very high resistance to the rotors continued movement and causes the mechanical motion to cease.

However, after the rotor has stopped and the various electrical currents in the system have flowed out, the motor is now effectively a generator. As there is no electrical current in the stator, there is effectively only mechanical resistance preventing the rotor from rotating and generating an induced electrical current in the stator. Thus, in an emergency stop scenario where power is cut to the motor, the motor will rapidly come to a halt due to the braking applied from the opposing fields, but shortly thereafter the motor will become a generator and the belt may be moved with the motor freewheeling since there is no electrical flow and only mechanical friction (which is often purposefully relatively small) to resist movement of the rotor.

SUMMARY OF THE INVENTION

The following is a summary of the invention, which should provide to the reader a basic understanding of some aspects of the invention. This summary is not intended to identify critical elements of the invention or in any way to delineate the scope of the invention. The sole purpose of this summary is to present in simplified text some aspects of the invention as a prelude to the more detailed description presented below.

Because of these and other problems in the art, there is a need for braking systems, and particularly emergency braking systems, for high incline exercise machines. These braking systems need to handle braking both if the user stops operation of the device at a high incline in a normal or "prepared" fashion (e.g. by pushing a button to stop the motor) or in the emergency situation where the motor power supply is shut off due to the safety key being pulled.

DETAILED DESCRIPTION OF THE PREFERRED EMBODIMENT(S)

This disclosure provides for the use of an active braking mechanism to be used to halt the motion of a treadmill belt, or other exercise system, when the engine ceases driving it and to hold the belt or system after the brake is engaged. The types of braking systems will generally utilize at least one but often two or more forms of electrical braking. Frictional braking systems may also be present, but the electrical braking systems will generally be primarily responsible for braking the belt at high inclines.

The electrical braking systems discussed herein will typically utilize the power supply for the motor in the exercise machines as part of the braking apparatus and, therefore, more actively control braking. Thus, in an emergency stop scenario, power is not actually cut off, instead the braking system is triggered. Depending on the embodiment, power cut-off may occur to the motor, but the braking system will generally still be engaged electrically. Typical known electrical braking systems come in two general types. The first is regenerative braking systems, which are common on hybrid and electrical automobiles but not used on exercise machines, and reverse voltage braking or plug braking systems. However, the systems and methods contemplated herein propose using dynamic braking mechanisms either alone or in combination with these two prior electrical braking systems. Dynamic braking systems useable in the present systems and methods typically come in four general types. DC Injection Braking, Capacitor Braking, Magnetic Braking, and AC dynamic braking.

In regenerative braking, an induction motor which would normally power the tread belt is forced to run at speeds in excess of the synchronous speed, the load torque exceeds the machine torque and the slip is negative. The induced emf and rotor current will also reverse. In this situation the motor will act as a generator with energy being returned to the supply. A regenerative brake is an energy recovery mechanism which slows a vehicle by converting its kinetic energy into another form, which can be either used immediately or stored until needed. Regenerative braking systems can be used on a high incline exercise machine by simply adding in a battery or other storage mechanism for the generated electricity.

In reverse voltage braking or "plug braking", you change the direction of the revolving magnetic field in the motor to oppose the direction of former magnetic field by changing the phase sequence of the three-phase voltage supply to the stator windings. This creates an opposing torque on the motor which continued rotation on the motor has to fight. Because of the opposing torque the motor will generally be brought to a halt in a short time and the motor will then actually try to pull in the opposing direction. In a high incline system, this direction is uphill for the belt making it unlikely that this opposing torque can actually move the belt in the opposing direction as it would also have to effectively "lift" the mass of the user.

As the rotor in the motor will always try to catch up with the rotating magnetic field, the field can be reversed rapidly simply by interchanging any two of the supply leads. If the leads on the stator windings are reversed suddenly, the direction of rotation of the stator field is reversed. The resulting slip is therefore larger than 1 and the motor will typically come to a very quick or even abrupt stop.

Slip is the difference between the stator and rotor frequencies. An induction motor needs current and slip to produce torque. Positive slip (rotor frequency slower than stator frequency) produces motoring torque and negative slip (rotor frequency faster than stator frequency) produces braking torque or loss of motor torque. Slip varies with changes in speed of the motor. Braking torque drops off markedly as speed increases. The percentage of slip can be calculated by the following formula:

$$\frac{100 * (\text{Synchronous Speed} - \text{Rotor Speed})}{\text{Synchronous Speed}}$$

where synchronous speed is the number of times the stator field makes a 360-degree rotation and rotor speed is the number of times the rotor turns relative to the synchronous speed.

For a voltage to be induced into the rotor to turn the output shaft, the rotor must turn slower than the synchronous speed of the stator field so that the rotor bars cut through the stator flux lines. This interaction of rotor magnetic field to stator field creates induced EMF and slip. Rotor speed is affected by system friction, air resistance, mechanical load, and electrical braking methods.

Very rapid reversal is possible using plug braking. Thus plug braking can be very useful as a method to quickly stop the motor, but frequent plug braking will cause serious overheating, because each reversal involves the "dumping" of four times the stored kinetic energy as heat in the windings. Further, plug braking requires that there be power provided to the motor. In the event of a power outage which results in the treadmill losing power and needing to stop quickly, this can be problematic and thus plug braking may not always be the most effective form of braking to use in emergency stopping situations.

Figure 1:
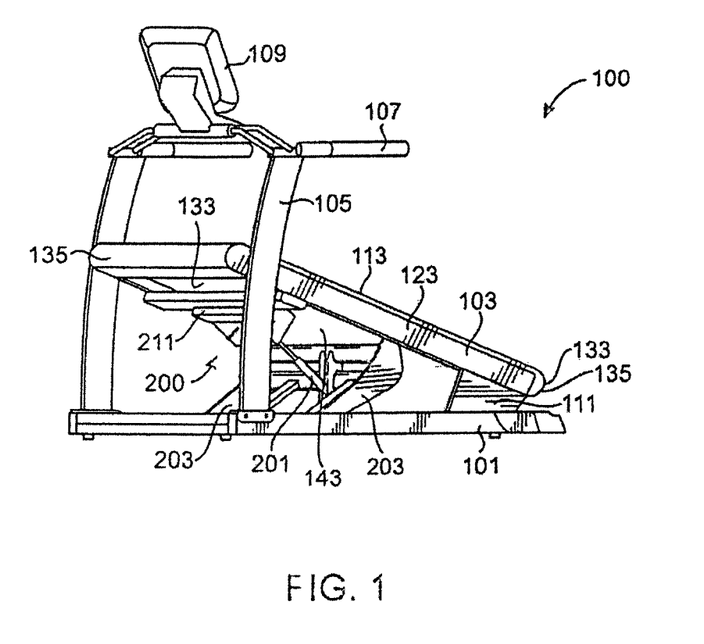
FIG. 1 provides for a typical embodiment of a treadmill exercise machine that may utilize braking systems as contemplated herein.

FIG. 1 provides an overview of a first embodiment of a treadmill (100). In the depicted embodiment, the treadmill (100) comprises a floor stand (101) which is generally composed of a series of pipes or rails arranged in the form of a hollow parallelogram. Attached to the floor stand (101) is a treadbase (103) which is formed of two side rails (123) which support two rollers (133) toward either end. As depicted there are also guards (135) which cover the ends of the treadbase (103) to inhibit unintended contact with moving parts.

There is then a flat endless belt (113) positioned around the rollers (133) which will act as the walking surface of the user. The belt (113) will often pass in close proximity and above a tread deck (143). The tread deck (143) will act to support the weight of the user and will provide the surface upon which their feet impact through the belt (113) when a user is walking or running on the belt (113). The tread deck (143) is generally necessary to support the mass of the user, however, tread decks (143) can be of substantially different construction and form from solid piece monolithic constructions, to multi-piece assemblies, to flexible or configurable arrangements depending on the intended uses of the treadmill, cost profiles, and desired capabilities. For purposes of this disclosure, the tread deck (143) can generally be of any form known to the art or later discovered.

The belt (113) is driven by a motor (111) which, in the depicted embodiment of FIG. 1, is mounted at the rear of the floor stand (101) and is connected to the treadbase (103), but that is not required. It should be noted herein that this disclosure utilizes the terms "front" and "back" of the treadmill (100) and other structures. As this disclosure, and common parlance, generally provides for exercise machines that will commonly provide incline, but will generally only provide decline if they also provide incline, it is expected that the front of the treadbase (103) will need to be capable of being arranged at a physically higher relative location to the rear of the treadbase (103) in an incline arrangement. To put this another way, the front of the treadbase (103) will need to move vertically away from the floor stand (101) (if the floor stand (101) is considered horizontal) by a greater amount than the rear of the treadbase (103) moves vertically away in the same time interval.

A user walking forward (facing the front of the treadbase (103)) on this treadmill (100) would, therefore, be walking up an incline. However, if the user was to rotate, the treadmill (100) would provide a decline exercise, which may be useful to some users. Further, it should be noted that the same structure discussed herein can be used for a decline treadmill The depicted treadmill (100) will also include a pair of support arms (105). These are arranged toward the front of the treadmill (100) and will generally serve to provide for a support for components to be used by a user standing, walking, or running on the treadbase (103). The support arms (105) terminate at a top which will generally comprise at least one handle (107) which the user can grip to provide stability, and a console (109) which can be used to control the motors (111) and other components of the treadmill (100). The console (109) may also be equipped to provide comfort features as is standard in the industry including providing a rack to hold reading material, a screen to display video, and/or an audio player.

Figure 2:
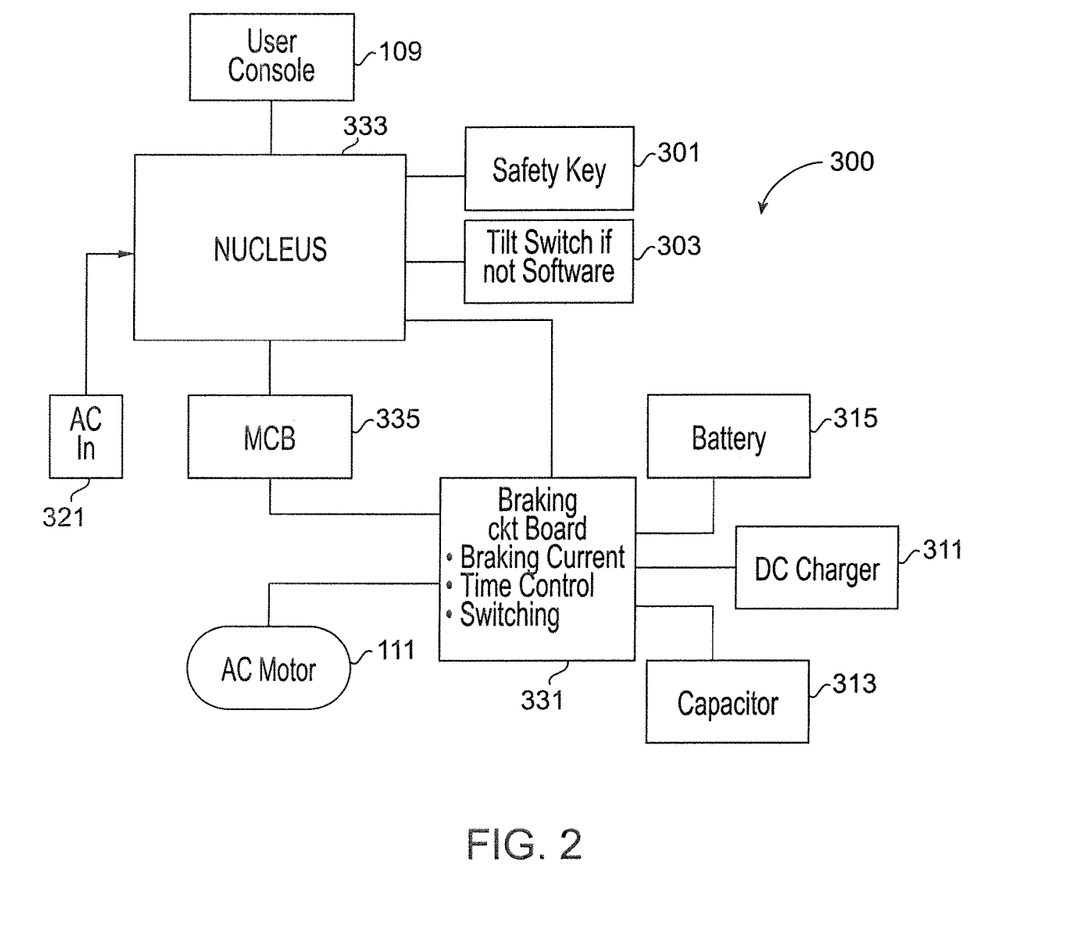
FIG. 2 provides for a general block diagram of a control system for implementing Direct Current (DC) injection braking alone or in conjunction with other braking mechanisms.

As part of the console (109), there will commonly be safety key (301) shut off mechanism as shown in FIG. 2. In the vast majority of cases, this safety key (301) will act to break the circuit of electricity running to the motor (111) and therefore in the event of a fall or other potentially dangerous movement of the user on the treadmill, the motor (111) will immediately stop.

While FIG. 1 contemplates a treadmill (100) of a type which the present braking systems can be used with, other exercise machines including other designs of treadmills, stair climbers, ladder climbers, elliptical exercisers, stationary bicycles, and others may also be used with the braking systems contemplated herein. Generally, the braking systems will only be limited to exercise machines which have some form of electric motor connected to the exercise mechanism, as opposed to being used on exercise machines which are entirely powered by user motion.

FIG. 2 provides a general block diagram of a typical electrical braking system (300) useable with an exercise machine as contemplated herein. As can be seen, one of the elements is preferably a direct current (DC) charger (311) which can act as a source of DC current as opposed to the typical alternating current (AC) source (321) that most exercise machines operate from. This allows for a DC injection braking which provides both for quick braking, and provides a lock which holds the induction motor (111) in position even when the emergency stop has cut off the electrical flow. DC injection braking is one of the high-slip braking processes that puts kinetic braking load energy into the motor rotor and DC injection is most effective at low motor speeds for preventing creep during braking.

DC Injection braking is an electronic braking method causing a 3 phase induction motor (111) to resist rotation when DC current is applied through 2 of the 3 stator leads. The rotor always tries to run at the same speed/frequency as the stator/rotor air-gap field, and if any two phases are injected with DC while the AC is removed, the air-gap field frequency becomes 0 Hz and a braking torque will occur by setting up a "static" magnetic field in the air-gap. This not only serves to stop the rotor (which tries to match the rotating speed of the magnetic field) but also serves to hold it in position so that it cannot move until the DC is removed.

Figure 3:
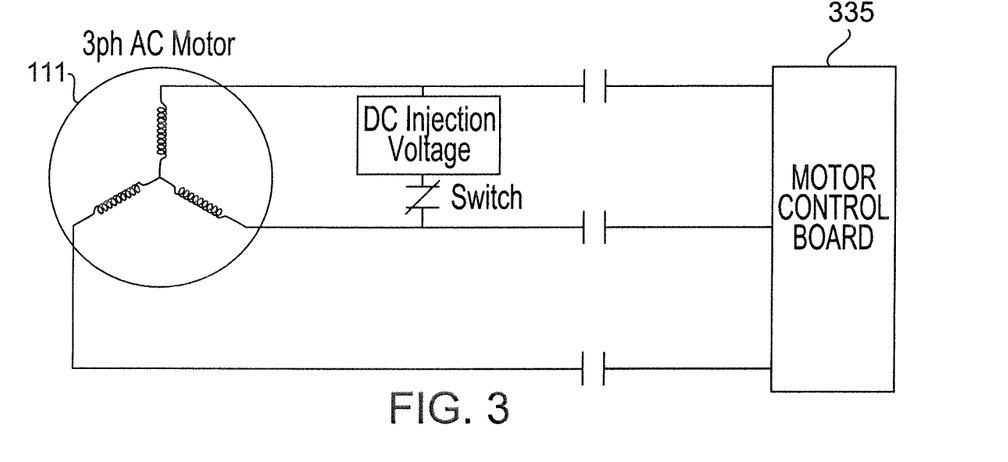
FIG. 3 shows a circuit diagram of an embodiment of a braking system using Direct Current (DC) injection.

FIG. 3 provides for a circuit diagram suitable for a DC injection braking mechanism.

As can be seen in FIG. 2, control for the DC injection braking mechanism may be provided by a circuit board (331) or other hardware controller. Alternatively, it may be provided by a computer running software and performing the same function. Generally, AC electricity (321), such as from a wall outlet, will be used to power the motor (111) and the brake controller (331). The AC electricity (321) may be input anywhere, but in the depiction of FIG. 2, is provided through a main controller (333) which serves to distribute power. Motor (111) control will be implemented by a motor controller (335). The main controller (333) may be implemented in hardware or in a computer running software. The brake controller (331) may also include a backup source of power such as battery (315) and/or capacitor (313). These power sources (315) and (313) can also be used to provide a source of DC power to the DC Charger (311) or the DC charger (311) may include an additional source of DC electricity. Should the safety key (301) be pulled or another event, such as tilt switch (303) be activated, the main controller (333) will generally serve to completely cut power to the motor (111). As part of this, electricity may also be cut off to the brake controller (331). However, as the brake controller (331) will generally be able to obtain DC electricity, the brake controller is still able to inject DC electricity into the motor (111).

DC injection braking is generally only suitable for stopping the motor (111) and not continuous braking (e.g. resistance) as the rotor will want to stop and remain stopped and it is generally not possible to generate a "partially DC" input. The amount of braking torque is dependent on the amount of DC current injected into the motor (111) and the amount "slip" created. Independent sources of DC voltage can be derived from a variable power supply, a fixed power supply, a battery (315), or electrolytic capacitors (313) which are sources that are connected to the motor (111) stator leads just for braking.

Figure 4:
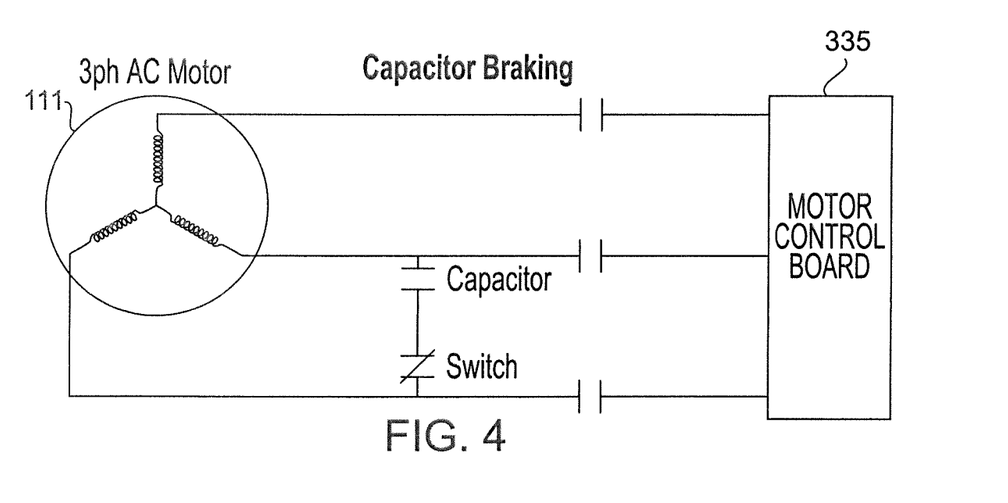
FIG. 4 shows a circuit diagram of an embodiment of a braking system using capacitor braking.

AC dynamic braking is a process in which kinetic energy of the rotor is dissipated in a resistor as heat energy after disconnecting the main supply. Thus, when the main supply is connected, back-driving of the motor due to the belt being rotated generates into a load resistor which will generate heat. This can result in faster braking than simply back-driving the motor. Capacitor braking is a similar process to AC dynamic braking, but provides a capacitor to store energy which comes from rotor magnetic circuit as opposed to dissipating the energy as heat. Now the motor will act as a generator and electric power will be dissipated in the inherent resistance of the windings and this is where additional braking is accomplished. An example of a block circuit diagram for capacitor braking is shown in FIG. 4. As should be apparent from the above, this circuit can be used to perform AC dynamic braking by replacing the capacitor with a resistor.

Figure 5:
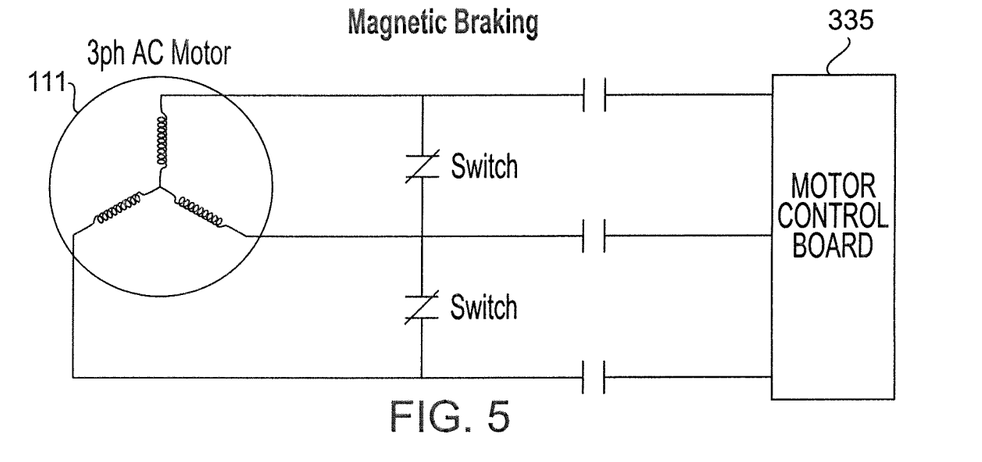
FIG. 5 shows a circuit diagram of an embodiment of a braking system using magnetic braking.

Magnetic braking of an induction motor is achieved by shorting two or three stator leads after the field is established and the main ac supply is disconnected. It does not require additional input energy and generates less heat because the only energy spent is the rotating drive shaft kinetic energy. Magnetic braking works because of induced currents and Lenz's law. When the plate enters the magnetic field, an electric field is induced and a circulating "eddy currents" are generated. These currents will act to oppose the change in flux through the plate, in accordance with Lenz's law. The currents in turn will dissipate some of the plate's energy, thereby reducing its velocity. FIG. 5 provides for an embodiment of a block circuit diagram which can be used to provide for magnetic braking.

Figure 6:
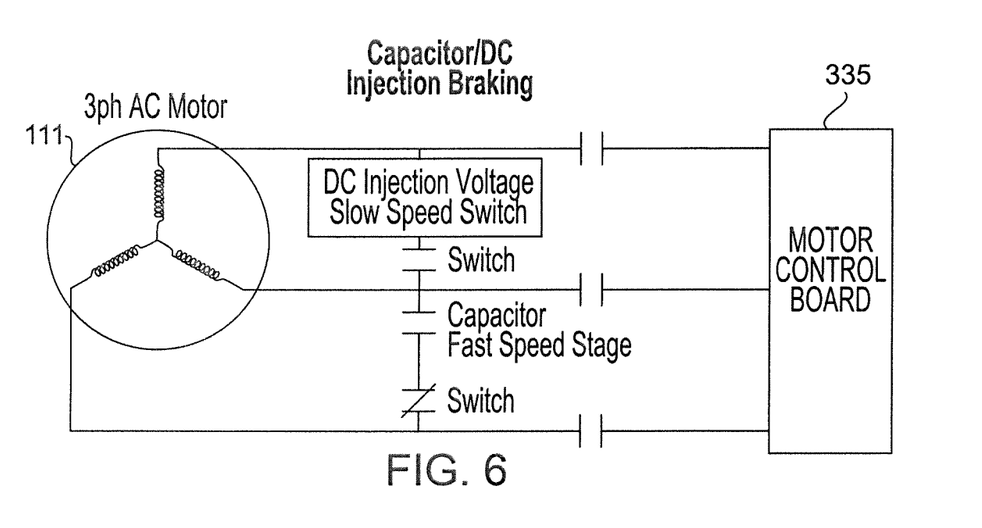
FIG. 6 shows a circuit diagram of an embodiment of a braking system using Direct Current (DC) injection in conjunction with capacitor braking.
Figure 7:
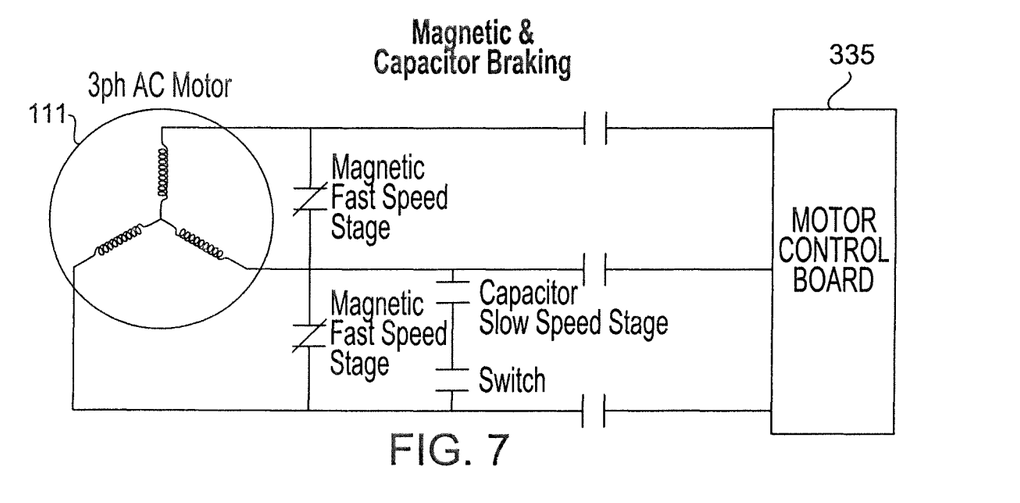
FIG. 7 shows a circuit diagram of an embodiment of a braking system using magnetic braking in conjunction with capacitor braking.
Figure 8:
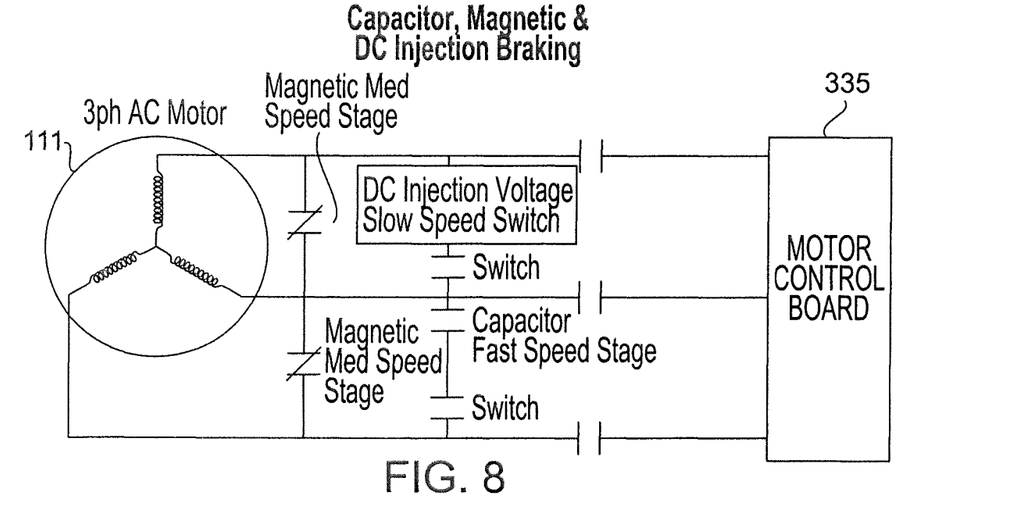
FIG. 8 shows a circuit diagram of an embodiment of a braking system using Direct Current (DC) injection in conjunction with both capacitor braking and magnetic braking.

It is generally preferred that the braking mechanisms of the treadmill actually use a combination of different electronic braking mechanisms to provide for sufficient braking force for a rapid stop, and to provide that the belt is held in position for a relatively substantial time (e.g. more than 2, 10, 20, 30 or 60 seconds) even after the braking of the belt (the belt movement has reduced to zero) is completed. FIG. 6, FIG. 7, and FIG. 8 provide for various block circuit diagrams of braking systems which utilize more than one form of braking and would be suitable for an exercise device, however, one of ordinary skill in the art would understand that the systems and methods for braking discussed herein can be combined to form any combination to provide particular braking characteristics specific to each one.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

The invention claimed is:

1. A treadmill comprising:
   a treadbase including an endless belt thereon;
   an alternating current (AC) motor for rotating said endless belt about said treadbase; and
   a direct current (DC) charger, electrically connected to said AC motor; and
   a source of alternating current (AC) electricity, said DC charger being charged by said AC electricity;
   wherein removing said AC electricity from said treadmill causes said motor to stop operating and said DC charger to inject direct current (DC) electricity into said AC motor, and
   wherein said DC charger injecting DC electricity into said AC motor inhibits said endless belt from moving.

2. The treadmill of claim 1 further comprising a source of direct current (DC) electricity electrically connected to said DC charger.

3. The treadmill of claim 1 wherein said source of DC electricity comprises a battery.

4. The treadmill of claim 1 wherein said DC charger includes a capacitor.

5. The treadmill of claim 1 wherein said AC motor is a 3-phase induction motor and said AC electricity is 3-phase electricity.

6. The treadmill of claim 5 wherein said DC charger injects DC electricity into two of three stator leads in said 3-phase induction motor.

7. The treadmill of claim 6 wherein at least two of three stator leads in said 3-phase induction motor is shorted because of said removing.

8. The treadmill of claim 1 wherein said treadbase of said treadmill inclines to a greater than 15% incline.

9. The treadmill of claim 1 wherein said treadbase of said treadmill inclines to a greater than 20% incline.

10. The treadmill of claim 1 wherein said treadbase of said treadmill inclines to a greater than 25% incline.

11. The treadmill of claim 1 wherein said treadbase of said treadmill inclines to a greater than 30% incline.

12. The treadmill of claim 1 wherein said endless belt cannot move relative said treadbase while said DC charger is injecting DC electricity into said AC motor.

13. The treadmill of claim 1 further comprising a frictional braking mechanism for said endless belt.

14. The treadmill of claim 1 wherein said DC charger can inject DC electricity into said AC motor for at least 10 seconds.

15. The treadmill of claim 1 wherein said DC charger can inject DC electricity into said AC motor for at least 20 seconds.

16. The treadmill of claim 1 wherein said DC charger can inject DC electricity into said AC motor for at least 30 seconds.

17. The treadmill of claim 1 wherein said DC charger can inject DC electricity into said AC motor for at least 60 seconds.

18. The treadmill of claim 1 further comprising: an AC load resistor wherein back-driving of said AC motor by said endless belt generates electricity into said AC load resistor.

19. The treadmill of claim 18 wherein said AC load resistor comprises an electrical resistor.

20. The treadmill of claim 18 wherein said AC load resistor comprises a capacitor.

* * * * *